United States Patent
Lee et al.

(10) Patent No.: US 9,419,276 B2
(45) Date of Patent: Aug. 16, 2016

(54) ANODE ACTIVE MATERIAL, LITHIUM SECONDARY BATTERY COMPRISING THE SAME, AND METHOD OF MANUFACTURING ANODE ACTIVE MATERIAL

(71) Applicant: LG Chem, Ltd., Seoul (KR)

(72) Inventors: Yong-Ju Lee, Daejeon (KR); Yoon-Ah Kang, Daejeon (KR); Mi-Rim Lee, Daejeon (KR); Je-Young Kim, Daejeon (KR); Hye-Ran Jung, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/331,385

(22) Filed: Jul. 15, 2014

(65) Prior Publication Data

US 2014/0322606 A1 Oct. 30, 2014

Related U.S. Application Data

(63) Continuation of application No. PCT/KR2013/011033, filed on Nov. 29, 2013.

(30) Foreign Application Priority Data

Nov. 30, 2012 (KR) .................. 10-2012-0138382
Nov. 29, 2013 (KR) .................. 10-2013-0147908

(51) Int. Cl.
| | |
|---|---|
| H01M 4/02 | (2006.01) |
| H01M 4/36 | (2006.01) |
| H01M 4/134 | (2010.01) |
| H01M 4/38 | (2006.01) |
| H01M 4/04 | (2006.01) |
| H01M 4/131 | (2010.01) |
| H01M 4/133 | (2010.01) |

(Continued)

(52) U.S. Cl.
CPC ............ *H01M 4/366* (2013.01); *H01M 4/0471* (2013.01); *H01M 4/131* (2013.01);
(Continued)

(58) Field of Classification Search
CPC ........................................................ H01M 4/02
See application file for complete search history.

(56) References Cited

U.S. PATENT DOCUMENTS 5,395,711 A * 3/1995 Tahara et al. .................. 429/332
6,991,874 B1 1/2006 Mohwald et al.
(Continued)

FOREIGN PATENT DOCUMENTS

EP 2372816 A1 10/2011
JP 2014103019 A 6/2014
(Continued)

OTHER PUBLICATIONS

Qiao et al. "SnO2@C core-shell spheres: synthesis, characterization, and performance in reversible Li-ion storage", Journal of Material Science, Publsihed Feb. 2008.*
(Continued)

*Primary Examiner* — Jacob Marks
(74) *Attorney, Agent, or Firm* — Lerner, David, Littenberg, Krumholz & Mentlik, LLP

(57) ABSTRACT

The present disclosure relates to an anode active material comprising a composite of a core-shell structure, a lithium secondary battery comprising the same, and a method of manufacturing the anode active material. According to an aspect of the present disclosure, there is provided an anode active material of a core-shell structure comprising a core including alloyed (quasi)metal oxide-Li ($MO_x$—$Li_y$) and a shell including a carbon material coated on a surface of the core. According to another aspect of the present disclosure, there is provided a method of manufacturing the anode active material of the core-shell structure. According to an aspect of the present disclosure, an anode active material with high capacity, excellent cycle characteristics and volume expansion control capacity, and high initial efficiency is provided.

19 Claims, 6 Drawing Sheets

(51) Int. Cl.
  *H01M 4/1391* (2010.01)
  *H01M 4/1393* (2010.01)
  *H01M 4/1395* (2010.01)
  *H01M 4/485* (2010.01)
  *H01M 4/62* (2006.01)
  *H01M 10/052* (2010.01)
  *H01M 10/0525* (2010.01)

(52) U.S. Cl.
  CPC ............ *H01M 4/133* (2013.01); *H01M 4/134* (2013.01); *H01M 4/1391* (2013.01); *H01M 4/1393* (2013.01); *H01M 4/1395* (2013.01); *H01M 4/38* (2013.01); *H01M 4/386* (2013.01); *H01M 4/387* (2013.01); *H01M 4/485* (2013.01); *H01M 4/625* (2013.01); *H01M 10/052* (2013.01); *H01M 10/0525* (2013.01); *Y02E 60/122* (2013.01)

(56) References Cited

U.S. PATENT DOCUMENTS

| | | | |
|---|---|---|---|
| 7,776,473 | B2 | 8/2010 | Aramata et al. |
| 2007/0166611 | A1* | 7/2007 | Oh et al. ............ 429/160 |
| 2007/0224508 | A1 | 9/2007 | Aramata et al. |
| 2009/0305114 | A1* | 12/2009 | Yeo ................ 429/56 |
| 2011/0244334 | A1* | 10/2011 | Kawada ............ 429/231.8 |
| 2011/0311875 | A1 | 12/2011 | Lee et al. |
| 2012/0282521 | A1 | 11/2012 | Choi et al. |
| 2014/0170485 | A1 | 6/2014 | Lee et al. |

FOREIGN PATENT DOCUMENTS

| | | |
|---|---|---|
| KR | 20120124779 A | 11/2012 |
| KR | 20130045212 A | 5/2013 |
| WO | 2007/133005 A1 | 11/2007 |
| WO | 2010058990 A2 | 5/2010 |
| WO | 2012158608 A1 | 11/2012 |

OTHER PUBLICATIONS

International Search Report for PCT/KR2013/011033 mailed Mar. 20, 2014.

Written Opinion of the International Searching Authority for PCT/KR2013/011033 mailed Mar. 20, 2014.

Extended Search Report from European Application No. 13858136.8, dated Feb. 15, 2016.

* cited by examiner

ANODE ACTIVE MATERIAL, LITHIUM SECONDARY BATTERY COMPRISING THE SAME, AND METHOD OF MANUFACTURING ANODE ACTIVE MATERIAL

CROSS-REFERENCE TO RELATED APPLICATION

The present application is a continuation of International Application No. PCT/KR2013/011033 filed on Nov. 29, 2013, which claims priority to Korean Patent Application No. 10-2012-0138382 filed in the Republic of Korea on Nov. 30, 2012 and Korean Patent Application No. 10-2013-0147908 filed in the Republic of Korea on Nov. 29, 2013, the disclosures of which are incorporated herein by reference.

TECHNICAL FIELD

The present disclosure relates to an anode active material, and more particularly, to an anode active material comprising a composite of a core-shell structure, a lithium secondary battery comprising the same, and a method of manufacturing the anode active material.

BACKGROUND ART

Recently, there has been growing interest in energy storage technologies. As the application fields of energy storage technologies have been extended to mobile phones, camcorders, lap-top computers and even electric cars, efforts have increasingly been made towards the research and development of electrochemical devices. In this aspect, electrochemical devices have attracted the most attention. The development of rechargeable secondary batteries has been the focus of particular interest. In recent years, extensive research and development has been conducted to design new electrodes and batteries for the purpose of improving capacity density and specific energy of the batteries.

Among currently available secondary batteries, lithium secondary batteries developed in the early 1990's have received a great deal of attention due to their advantages of higher operating voltages and much higher energy densities than conventional batteries using aqueous electrolyte solutions, such as Ni—MH batteries, Ni—Cd batteries, $H_2SO_4$—Pb batteries, and the like. However, among them, a lithium ion secondary battery involves a safety issue such as a fire or explosion due to the use of an organic electrolyte solution, and has a disadvantage of being complicated to manufacture. A lithium polymer secondary battery designed to overcome these weak points of a lithium ion secondary battery is stated to be one of the next-generation batteries of the future, but still has a relatively low capacity, in particular, an insufficient discharging capacity at low temperature, when compared to a lithium ion secondary battery, and accordingly, there is an urgent demand for improvement.

For this, there is a growing need for a high capacity anode material, and a (quasi)metal material having a high theoretical capacity, for example, Si— and Sn-based materials, is being applied as an anode active material, however these anode active materials deteriorate in cycle characteristics as charging and discharging repeats, and their extreme volume expansion has a negative influence on the performance and safety of a battery. Accordingly, studies have been conducted to improve the cycle characteristics and mitigate the volume expansion by using (quasi)metal oxide, for example, silicon oxide (SiOx) and the like, however (quasi)metal oxide has a shortcoming of significantly low initial efficiency because (quasi)metal oxide produces an irreversible phase due to an initial reaction of oxygen and lithium upon lithium insertion.

To compensate this defect, if (quasi)metal oxide is prealloyed with lithium so that (quasi)metal oxide contains lithium, an irreversible phase such as lithium oxide or lithium metal oxide is produced in a reduced amount during initial charging/discharging of a battery, resulting in increased initial efficiency of an anode active material.

A lithium source for pre-alloying (quasi)metal oxide with lithium may be largely classified into a lithium metal, a lithium salt free of oxygen, and a lithium salt containing oxygen.

Among them, a lithium salt free of oxygen is mostly ionically bonded, and thus its reaction with (quasi)metal oxide is extremely limited. Also, the use of a lithium salt containing oxygen hinders the adjustment of an oxygen content of (quasi)metal oxide since oxygen in a lithium salt reacts with (quasi)metal oxide in the process of a reaction between (quasi)metal oxide and a lithium salt containing oxygen. Also, due to a by-product derived from a reaction between an un-reacted lithium source residue and (quasi)metal oxide, there is still a gelation issue of an anode active material slurry in a battery fabrication process.

Meanwhile, in case a lithium metal is used as a lithium source, there are disadvantages such as high reactivity with water and high fire hazards, and formation of lithium carbonate caused by reaction with carbon dioxide.

DISCLOSURE

Technical Problem

The present disclosure is designed to provide a method of manufacturing an anode active material with excellent cycle characteristics and volume expansion control capability without forming a by-product by a reaction between a lithium source and (quasi)metal oxide, the anode active material, and a lithium secondary battery comprising the same.

Technical Solution

According to an aspect of the present disclosure, there is provided a method of manufacturing an anode active material comprising forming a composite of a core-shell structure $(MO_x$—$Li_y)$—C, where M represents a (quasi)metal, x is greater than 0 and less than 1.5, and y is greater than 0 and less than 4, by coating a shell including a carbon material on a surface of a core including oxide of a (quasi)metal, forming a mixture by mixing the composite with lithium metal powder, and thermally treating the mixture so as to yield alloyed (quasi)metal oxide-Li in the core.

According to another aspect of the present disclosure, there is provided an anode active material including a composite of a core-shell structure having a formula $(MO_x$—$Li_y)$—C where M represents a (quasi)metal, x is greater than 0 and less than 1.5, and y is greater than 0 and less than 4, in which a core includes $(MO_x$—$Li_y)$ and a shell includes a carbon material coated on a surface of the core.

According to another aspect of the present disclosure, there is provided an anode for a lithium secondary battery comprising a current collector, and an anode active material layer formed on at least one surface of the current collector and including the above-described anode active material.

According to another aspect of the present disclosure, there is provided a lithium secondary battery comprising an anode using the above-described anode active material, a cathode, and a separator interposed between the cathode and the anode.

Advantageous Effects

According to an aspect of the present disclosure, an anode active material with high capacity, excellent cycle characteristics and volume expansion control capacity, and high initial efficiency is provided.

BRIEF DESCRIPTION OF THE DRAWINGS

The accompanying drawing illustrates a preferred embodiment of the present disclosure and together with the foregoing disclosure, serves to provide further understanding of the technical spirit of the present disclosure, and thus, the present disclosure is not construed as being limited to the drawing.

DESCRIPTION OF THE PREFERRED EMBODIMENT

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
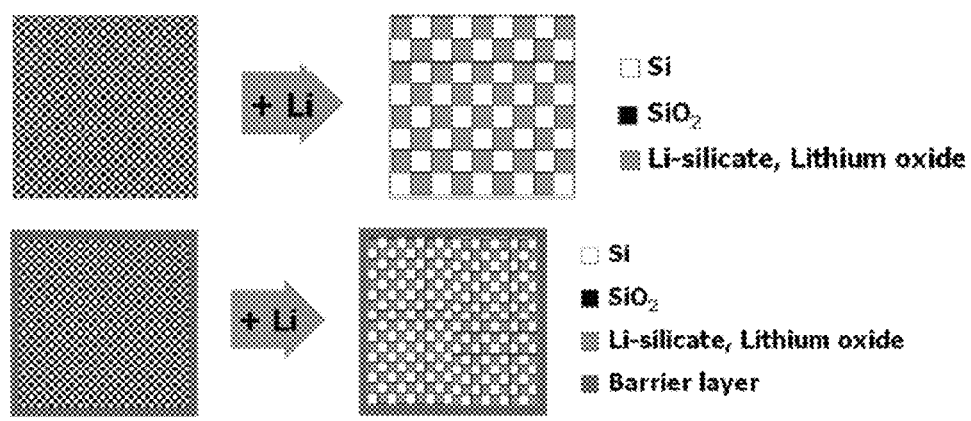
FIG. 1 is a schematic concept diagram illustrating formation of a structure of an anode active material according to an exemplary embodiment of the present disclosure.

FIG. 1 is a schematic concept diagram illustrating formation of a structure of an anode active material according to an exemplary embodiment of the present disclosure.

According to another aspect of the present disclosure, there is provided an anode active material including a composite of a core-shell structure, in which a core contains ($MO_x$—$Li_y$) and a shell contains a carbon material coated on the surface of the core, represented by the formula ($MO_x$—$Li_y$)—C where M represents a (quasi)metal, x is greater than 0 and less than 1.5, and y is greater than 0 and less than 4.

The core includes a (quasi)metal. The (quasi)metal may be selected from the group consisting of Si, Sn, Al, Sb, Bi, As, Ge, Pb, Zn, Cd, In, Ti, Ga, and alloys thereof, but is not limited thereto. The (quasi)metal is present within the core in a form of oxide. Preferably, the oxide of the (quasi)metal may include, as a non-limiting example, any one compound selected from the group consisting of SiO, SnO and SnO, or mixtures thereof. Also, to adjust an oxygen content of (quasi) metal oxide in a final product, the core may further include a (quasi)metal, for example, the above-described (quasi)metal, if necessary.

A diameter of the core may be in a range of about 0.05 to about 30 μm or in a range of about 0.5 to about 15 μm.

The shell includes a carbon material. The shell exists in a form of a coating layer on the surface of the core to form the composite of the core-shell structure. The shell may act as a lithium-reaction barrier layer to suppress a fast reaction between lithium and (quasi)metal oxide.

As the carbon material, crystalline carbon, amorphous carbon or a mixture thereof may be used, and the content of the carbon material in the shell may be in a range of about 0.05 to about 30 wt % or in a range of about 1 to about 20 wt % based on the weight of the anode active material.

The anode active material has a high capacity, and when used in a battery, is excellent in cycle characteristics and volume expansion control capability, and its initial efficiency is found to be very high as well.

The shell of the composite as the lithium-reaction barrier layer should comprise a carbon material. Generally, when a metal crystal grows fast and a resulting large (quasi)metal particle is embedded in a structure such as a (quasi)metal oxide matrix, the matrix is incompetent in effectively suppressing the volume expansion of a (quasi) metal of a large particle size. That is, even in the same (quasi) metal oxide matrix, the size of the crystal present therein makes a big difference in an extent of cracking from crystal expansion and an extent of control of the matrix.

In case the shell is not a carbon material, a reaction between (quasi) metal oxide and lithium metal powder, for example, lithium of lithium metal powder is not controlled and a metal crystal in the (quasi) metal oxide grows fast. This metal crystal growth causes stress as the volume expands due to a weak ionic bond between a metal and lithium, which is likely to be vulnerable to cracks. This crack occurs irregularly, hence non-contact with an electrolyte or electrical disconnection may occur at some parts within the material, leading to a battery fault.

In this respect, a crystal grain size in the (quasi) metal included in the core is preferably from 2 nm to a maximum of 200 nm. More preferably, the crystal grain size is less than or equal to 100 nm, or less than or equal to 50 nm.

The crystal grain size in the (quasi) metal may be controlled by adjusting a heating temperature condition in a thermal treatment step after shell formation in a method of manufacturing an anode active material according to the present disclosure to be described later.

The anode active material of the present disclosure manufactured as described in the foregoing may be used to manufacture an anode by a manufacturing method generally used in the art. Also, a cathode according to the present disclosure may be manufactured by a general method in the art, similar to the anode. For example, an electrode may be manufactured by mixing an electrode active material of the present disclosure with a binder, a solvent, if necessary, a conductive material and a dispersant and agitating the mixture to prepare a slurry, applying the slurry to a current collector, and compressing the result.

The binder may be any one selected from the group consisting of polyvinylidene fluoride-co-hexafluoro propylene (PVDF-co-HFP), polyvinylidene fluoride-co-trichloro ethylene, polyvinylidene fluoride-co-chlorotrifluoro ethylene, polymethyl methacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethyl cellulose, cyanoethyl sucrose, pullulan, carboxyl methyl cellulose (CMC), acrylonitrile-styrene-butadiene copolymer, polyimide, polyvinylidenefluoride, polyacrylonitrile and styrene butadiene rubber (SBR), or mixtures thereof.

As the cathode active material, lithium-containing transition metal oxide may be preferably used, for example, any one selected from the group consisting of $Li_xCoO_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_x(Ni_aCo_bMn_c)O_2$ ($0.5<x<1.3$, $0<a<1$, $0<b<1$, $0<c<1$, $a+b+c=1$), $Li_xNi_{1-y}Co_yO_2$ ($0.5<x<1.3$, $0<y<1$), $Li_xCo_{1-y}Mn_yO_2$ ($0.5<x<1.3$, $0<y<1$), $Li_xNi_{1-y}Mn_yO_2$ ($0.5<x<1.3$, $0\leq y<1$), $Li_x(Ni_aCo_bMn_c)O_4$ ($0.5<x<1.3$, $0<a<2$, $0<b<2$, $0<c<2$, $a+b+c=2$), $Li_xMn_{2-z}Ni_zO_4$ ($0.5<x<1.3$, $0<z<2$), $Li_xMn_{2-z}Co_zO_4$ ($0.5<x<1.3$, $0<z<2$), $Li_xCoPO_4$ ($0.5<x<1.3$) and $Li_xFePO_4$ ($0.5<x<1.3$), or mixtures thereof, and the lithium-containing transition metal oxide may be coated with a metal such as aluminum (Al) or metal oxide. Also, besides the lithium-containing transition metal oxide, sulfide, selenide, and halide may be used.

When an electrode is manufactured, a lithium secondary battery generally used in the art may be manufactured using the electrode, in which a separator interposed between the cathode and the anode and an electrolyte solution are included.

In the electrolyte solution used in the present disclosure, a lithium salt included as an electrolyte may use, without limitation, those generally used in an electrolyte solution for a lithium secondary battery, and for example, an anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

In the electrolyte solution used in the present disclosure, an organic solvent included in the electrolyte solution may include, without limitation, those generally used in an electrolyte solution for a lithium secondary battery, as a representative example, any one selected from the group consisting of propylene carbonate (PC), ethylene carbonate (EC), diethyl carbonate (DEC), dimethyl carbonate (DMC), ethylmethyl-carbonate (EMC), methylpropyl carbonate, dipropyl carbonate, dimethylsulfoxide, acetonitrile, dimethoxyethane, diethoxyethane, vinylene carbonate, sulfolane, gamma butyrolactone, propylene sulfate, tetrahydrofuran, fluoro-ethylene carbonate (FEC), and propionate ester, for example, methyl-propionate, ethyl-propionate, propyl-propionate and butyl-propionate, or mixtures thereof. Particularly, among the carbonate-based organic solvents, cyclic carbonate such as ethylene carbonate and propylene carbonate corresponds to an organic solvent having a high viscosity, and is preferred to use because it dissociates a lithium salt in an electrolyte well due to its high dielectric constant, and in this instance, such cyclic carbonate is more preferred to use because it contributes to form an electrolyte solution having high electrical conductivity when mixed with linear carbonate having a low viscosity and a low dielectric constant such as dimethyl carbonate and diethyl carbonate at a proper ratio.

Optionally, the electrolyte solution stored according to the present disclosure may further include an additive, such as an overcharge inhibitor, used in a general electrolyte solution.

Also, the separator may use a general porous polymer film used as a separator in the art, for example, a porous polymer film made from a polyolefin-based polymer such as an ethylene homopolymer, a propylene homopolymer, an ethylene/butene copolymer, an ethylene/hexene copolymer, and an ethylene/methacrylate copolymer, arranged singularly or in a stack, or a general porous non-woven fabric, for example, a non-woven fabric made from a glass fiber having a high melting point, a polyethyleneterephthalate fiber, and the like, however the present disclosure is not limited thereto.

Optionally, the separator may additionally include a porous coating layer on the surface thereof. The porous coating layer includes inorganic particles and a binder. The binder is disposed in all or a part of the inorganic particles to couple and bond the inorganic particles to one another.

The inorganic particles may use an inorganic particle having a dielectric constant greater than or equal to 5 and an inorganic particle having a lithium ion delivery capability (in a case of a lithium secondary battery), singularly or in combination. The inorganic particle having a dielectric constant greater than or equal to 5 may be any one selected from the group consisting of $BaTiO_3$, $P_b(Zr_xTi_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_{3-x}PbTiO_3$(PMN-PT, $0<x<1$), hafnia ($HfO_2$), $SrTiO_3$, $SnO_2$, $CeO_2$, $MgO$, $NiO$, $CaO$, $ZnO$, $ZrO_2$, $SiO_2$, $Y_2O_3$, $Al_2O_3$, $SiC$ and $TiO_2$, or mixtures thereof. The inorganic particle having a lithium ion delivery capability may be, as a non-limiting example, any one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ ($Li_x$-$Si_yS_z$, $0<x<3$, $0<y<2$, $0<z<4$)-based glass and $P_2S_5$ ($Li_xP_yS_z$, $0<x<3$, $0<y<3$, $0<z<7$)-based glass, or mixtures thereof. There is not special limitation in an average particle diameter of the inorganic particles, but with the aim to form a porous coating layer having a uniform thickness and ensure a proper porosity, the average particle diameter may be in a range of about 0.001 μm to about 10 μm. The average particle diameter of the inorganic particles satisfying the range prevents dispersibility of the inorganic particles from reducing and enables adjustment of the porous coating layer to a proper thickness.

The binder content may be in a range of about 0.1 to about 20 parts by weight, preferably, in a range of about 1 to about 5 parts by weight, based on the total 100 parts by weight of the binder and the inorganic particles. As non-limiting example, the binder may be any one selected from the group consisting of polyvinylidene fluoride-co-hexafluoro propylene (PVDF-co-HFP), polyvinylidene fluoride-co-trichloro ethylene, polyvinylidene fluoride-co-chlorotrifluoro ethylene, polymethyl methacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethyl cellulose, cyanoethyl sucrose, pullulan, carboxyl methyl cellulose (CMC), acrylonitrile-styrene-butadiene copolymer, polyimide, polyvinylidenefluoride, polyacrylonitrile and styrene butadiene rubber (SBR), or mixtures thereof.

A battery casing used in the present disclosure may employ those generally used in the art, and is not limited to a specific outer shape based on a use of a battery, and the battery casing may have, for example, a circular shape using a can, a prismatic shape, a pouch shape, a coin shape, and the like.

A method of manufacturing the anode active material according to an exemplary embodiment of the present disclosure introduces lithium to (quasi)metal oxide of a core in a composite of a core-shell structure, and involves mixing the composite with lithium metal powder and thermally treating the mixture to form the composite of the core-shell structure having a formula $(MO_x\text{—}Li_y)$—C for alloyed (quasi)metal oxide-Li in the core where M represents a (quasi)metal, x is greater than 0 and less than 1.5, and y is greater than 0 and less than 4.

Figure 2:
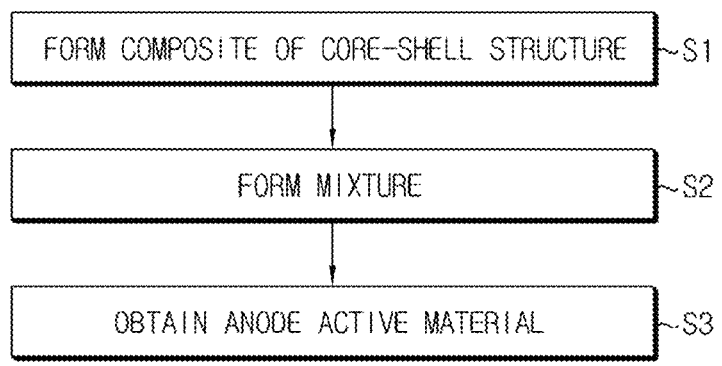
FIG. 2 is a flowchart illustrating a method of manufacturing an anode active material according to an exemplary embodiment of the present disclosure.

FIG. 2 is a flowchart illustrating a method of manufacturing an anode active material according to an exemplary embodiment of the present disclosure. A detailed description is provided below with reference to FIG. 2.

A method of manufacturing an anode active material according to an aspect of the present disclosure includes (S1) forming a composite of a core-shell structure, (S2) forming a mixture, and (S3) thermally treating the mixture. Through (S3), an alloyed (quasi)metal oxide-Li composite is formed in the core. In SI, the composite of the core-shell structure is manufactured by forming a shell on a surface of a core.

The core and the shell is the same as described previously in the description of the anode active material.

In the carbon material, for example, crystalline carbon may be coated on the core by mixing the core and the crystalline carbon in a solid or liquid phase, followed by coating.

When mixed in a solid phase, coating may be performed mainly by a mechanical mixing method, and the mechanical mixing method may include, for example, a kneading method, a mechanical mixing method that changes a wing structure of a mixer to apply shear stress during mixing, a mechanochemical method that induces a fusion over an interface between materials by mechanically applying a shear force to the materials, and the like.

When mixed in a liquid phase, a mechanical mixing method may be used similar to mixing in a solid phase, or spray drying, spray pyrolysis, or freeze drying may be carried out. As a solvent that may be added in a case of mixing in a liquid phase, water, an organic solvent, or a mixture thereof may be used, and as the organic solvent, ethanol, isopropyl alcohol, toluene, benzene, hexane, and tetrahydrofuran may be used.

When coating with amorphous carbon is carried out, a method that coats with an amorphous carbon precursor and carbonizes the carbon precursor through thermal treatment may be used. As the coating method, both dry and wet mixing may be used. Also, a chemical vapor deposition (CVD) method using gas containing carbon such as methane, ethane, propane, ethylene, and acetylene, may be used. The amorphous carbon precursor may include resins such as phenol resin, naphthalene resin, polyvinylalcohol resin, urethane resin, polyimide resin, furan resin, cellulose resin, epoxy resin and polystyrene resin, coal-derived pitches, petroleum-derived pitches, tar or intermediate crude oil with a low molecular weight, and the like.

In S2, the composite formed in S1 is mixed with lithium metal powder.

The composite formed in S1 is mixed with lithium metal powder by a chemical mixing method, a mechanical mixing method, a dry mixing method, and the like.

In a case of a chemical mixing method, an anode active material may be obtained by preparing a dispersion solution using a solvent and/or a dispersant, mixing the composite in the dispersion solution, and thermally treating the mixture.

The solvent or dispersant is not limited to a specific type, and is preferred if it enables uniform dissolution and mixing and may be subsequently removed. As a non-limiting example, the solvent or dispersant may be xylene such as p-xylene, heptane, hexane such as n-hexane, toluene, acetone, tetrahydrofuran, methylenechloride, chloroform, dimethylformamide, N-methyl-2-pyrrolidone, cyclohexane, dichloromethane, dimethylsulfoxide, acetonitrile, pyridine, amines, or mixed solutions thereof.

When forming the dispersion solution by dispersing the lithium metal powder in the solvent or dispersant and forming the mixture by mixing the dispersion solution with the (quasi)metal oxide, a dispersion device known in the art may be generally used to disperse the (quasi)metal oxide. The dispersion device is not particularly limited if it corresponds to a device that enables dispersion of a material to be dispersed in a solvent or dispersant, and may include, for example, an ultrasonic dispersion device, a magnetic stirring device, a spray dryer device, and the like.

Subsequently, the formed dispersion solution is dried at room temperature of about 25 to about 28° C. or at temperature of about 50 to about 200° C. to remove the solvent or dispersant, yielding a mixture of the composite and the lithium metal powder. However, as a method of removing the solvent or dispersant, methods known in the art may be used.

Also, the lithium metal powder and the composite may be uniformly mixed using a mechanical mixing method. Here, the mechanical mixing method is a method that pulverizes and mixes materials intended to mix by applying a mechanical force to form a uniform mixture.

Generally, mechanical mixing employs a mechanical mixing device using a chemically inactive bead or the like, for example, a high energy ball mill, a planetary mill, a stirred ball mill, a vibrating mill, and the like, and a process parameter may be changed, for example, a rotation rate, a ball-powder weight ratio, a ball size, a mixing time, mixing temperature and atmosphere, and the like. In this instance, to obtain an excellent mixing effect, alcohol such as ethanol and higher fatty acid such as stearic acid may be added as a processing control agent. The processing control agent may be added in an amount of about 2.0 parts by weight or less, preferably, 0.5 parts by weight or less, based on 100 parts by weight of the mixture. When the processing control agent is added, a mixing time may be shortened.

Also, in the mechanical mixing method, when there is a condition change, for example, a mixing time, a mixing temperature, and a rotation rate, to increase a rotation rate at high temperature for a long time, mechanical alloying may be performed at the same time of pulverizing and mixing the lithium metal powder and the composite. Through the mechanical mixing and mechanical alloying processes, the present disclosure may obtain an electrode active material in a type of an alloy of uniform composition. In this case, subsequent thermal treatment in an inert atmosphere may be omitted.

Also, the lithium metal powder and the composite may be mixed in a simple manner using dry mixing, and in this case, a mixing device may use, without limitation, any type of mixing device if it is a general one known in the art. For example, a shaker, a stirrer, and the like, may be used. After the mixing step is completed, a general thermal treatment step follows.

The composite formed in S1 and the lithium metal powder are mixed at a mixing ratio in a range of about 70:30 to about 98:2. Because lithium is a very light metal, mixing with the composite at a mixing ratio exceeding the range is unfavorable. For this reason, the mixing ratio is set to the above value.

When the weight ratio of the lithium metal powder is less than 2, a lithium content in a final product is too low and initial efficiency is not sufficiently high. In contrast, when the weight ratio of the lithium metal powder exceeds 30, excess inactive phases such as lithium oxide or lithium silicate are produced in a final product, resulting in a reduction in discharge capacity per unit weight and causing an alloying reaction of a (quasi)metal part with lithium. This lithium oxide or lithium silicate is a relatively stable phase, but when a lithium-(quasi)metal compound, for example, a Li—Si compound is set aside, it becomes unstable. For example, when about 10 wt % of the lithium metal powder is mixed with the composite, initial efficiency may reach nearly 90%.

In S3, the mixture formed in S2 is thermally treated to achieve (quasi)metal oxide-Li alloying in the core. The (quasi)metal oxide-Li alloying in the core by the thermal treatment forms a composite of a core-shell structure represented by the formula $(MO_x—Li_y)$—C where M represents a (quasi)metal, x is greater than 0 and less than 1.5, and y is greater than 0 and less than 4.

To allow the lithium metal powder to achieve Li alloying with (quasi)metal oxide in the core, the shell of the composite formed in S1 should comprise a carbon material. The reason is the same as described previously in the description of the anode active material.

The mixture of the composite formed in S2 and the lithium metal powder needs thermal treatment to form a (quasi)metal oxide-Li alloy.

Figure 5:
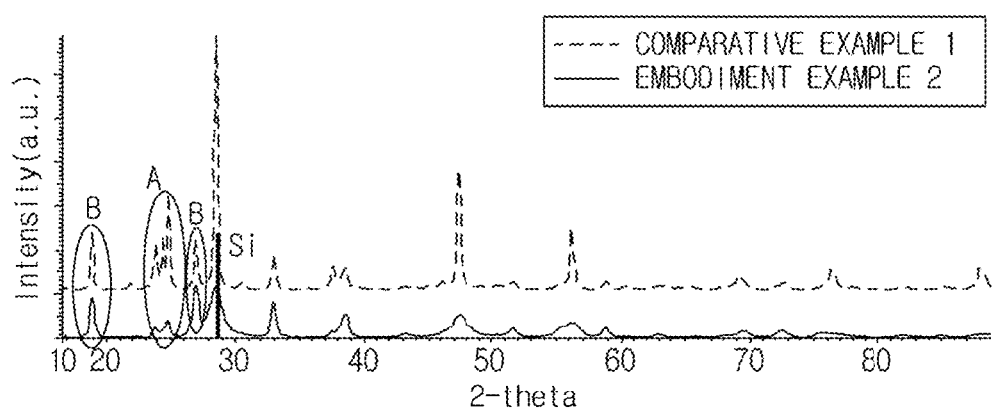
FIG. 5 illustrates an x-ray diffraction (XRD) analysis result of Embodiment example 1 and Comparative example 2.

When the mixture is thermally treated in an inert atmosphere within a reactor, (quasi)metal oxide and lithium react with one another to form a new bond, and in this instance, lithium may exist in a type of lithium oxide or lithium-(quasi) metal oxide. FIG. 5 illustrates an x-ray diffraction (XRD) graph of Embodiment example 1 and Comparative example 1 of the present disclosure. Referring to FIG. 5, peaks of $Li_2Si_2O_5$ (Section A) and $Li_2SiO_3$ (Section B) are observed at portions indicated by circles. It is found that an alloy of Li-(quasi)metal oxide such as $Li_2SiO_3$ and $Li_2Si_2O_5$ appears commonly in Embodiment example 1 and Comparative example 2 although it differs in peak intensity. This is because the peaks of the alloy result from a reaction of lithium and (quasi)metal oxide by thermal treatment.

In this instance, there is no special limitation in the thermal treatment temperature range if it is between a melting point of lithium metal powder and a boiling point of the lithium metal powder. If the temperature is less than the melting point of lithium metal powder, a reaction between lithium metal powder and (quasi)metal oxide may not occur, and when the temperature is higher than the boiling point of lithium metal powder, lithium metal powder may evaporate into gas before lithium sufficiently reacts with (quasi)metal oxide. Accordingly, the thermal treatment temperature range is preferably is in a range of about 500 to about 2000° C. or in a range of about 700 to about 1200° C.

Also, when the thermal treatment temperature is excessively high, excessive crystal grain growth in the (quasi)metal in the anode active material results, causing a weak ionic bond between a metal and lithium. Thereby, stress occurs as the volume expands, which is likely to be vulnerable to cracks. Accordingly, the heating temperature is preferably adjusted to a range of hindering the excessive crystal grain growth in the (quasi)metal in the anode active material, preferably, to obtain a crystal grain size less than or equal to a maximum of 200 nm.

For example, when mixing with (quasi)metal oxide such as SiO and thermally treating the mixture, temperature less than or equal to about 1100° C. is preferred. At temperature higher than 1100° C., SiO is strongly liable to grow while being separated into $SiO_2$ and SiO so that SiO may reduce its advantage of volume control. Also, as seen in the following example, Si crystal grains tend to increase in size with the increasing thermal treatment temperature. Accordingly, when thermally treating at temperature in a range of a melting point of lithium metal powder to a boiling point of the lithium metal powder, it is preferred to take a type of (quasi)metal oxide into consideration. Also, it is preferred to perform the thermal treatment in an inert gas atmosphere in which nitrogen gas, argon gas, helium gas, krypton gas, or xenon gas is present, to block the contact with oxygen. If the mixture comes into contact with oxygen during thermal treatment of the mixture, the lithium source reacts with metal oxide along with oxygen to form lithium oxide or lithium metal oxide, and as a result, an initial efficiency increase effect of the battery may decline.

In the (quasi)metal oxide-Li alloy, an oxygen content of (quasi)metal oxide is $MO_x$ (0<x<1.5), and when x exceeds 1.5, a relative amount of (quasi)metal oxide (M) corresponding to an electrochemical reaction site is low, which may induce a reduction in a total energy density and cause a problem that initial efficiency reduces.

The (quasi)metal oxide core of the present disclosure has the coating layer of the carbon material, that is, the shell, on the surface thereof, and the shell of the carbon material allows lithium to pass through but hinders oxygen from passing through, thereby preventing oxygen from reacting with (quasi)metal oxide of the core, so that it is easy to adjust the oxygen content of (quasi)metal oxide.

Also, in case of need, the surface of the composite in S3 may be washed and dried. This is because unreacted lithium metal powder or a by-product produced by a side reaction between lithium metal powder and (quasi)metal oxide may remain on the surface of the composite.

Hereinafter, a detailed description is provided through an embodiment example and a comparative example to describe embodiments and effects of the present disclosure more specifically. However, it should be understood that embodiments of the present disclosure may be modified in various forms and the scope of the invention is not limited to the following embodiment. The embodiments of the present disclosure are provided to describe the present disclosure to those skilled in the art more completely.

EMBODIMENT EXAMPLE

Embodiment Example 1

10 g of SiO having an average particle diameter of 5 μm as (quasi)metal oxide was put into a rotary tube furnace, and temperature was increased to 1000° C. at a rate of 5° C./min after flowing argon gas at a rate of 0.5 L/min. Thermal treatment was performed for 2 hours while rotating the rotary tube furnace at a rate of 10 rpm/min and flowing argon gas at a rate of 1.8 L/min and acetylene gas at a rate of 0.3 L/min, to manufacture a composite of a core-shell structure in which a conductive carbon material as a shell is coated on the surface of SiO as a core. Here, the carbon content of the shell was 5.3 parts by weight based on 100 parts by weight of the core. Also, it was observed from TEM analysis that the shell was 40 nm thick.

The manufactured composite was mixed with lithium metal powder at a weight ratio of 92:8 to form a mixture.

The mixture was thermally treated at 700° C. for 5 hours under an Ar atmosphere to manufacture an anode active material in which lithium alloying is implemented in the core. In the composition of the anode active material, that is, formula $(MO_x—Li_y)$—C, it could be seen from its measurement result that $0<x<1.5$ and $0 21 y<4$.

Figure 3:
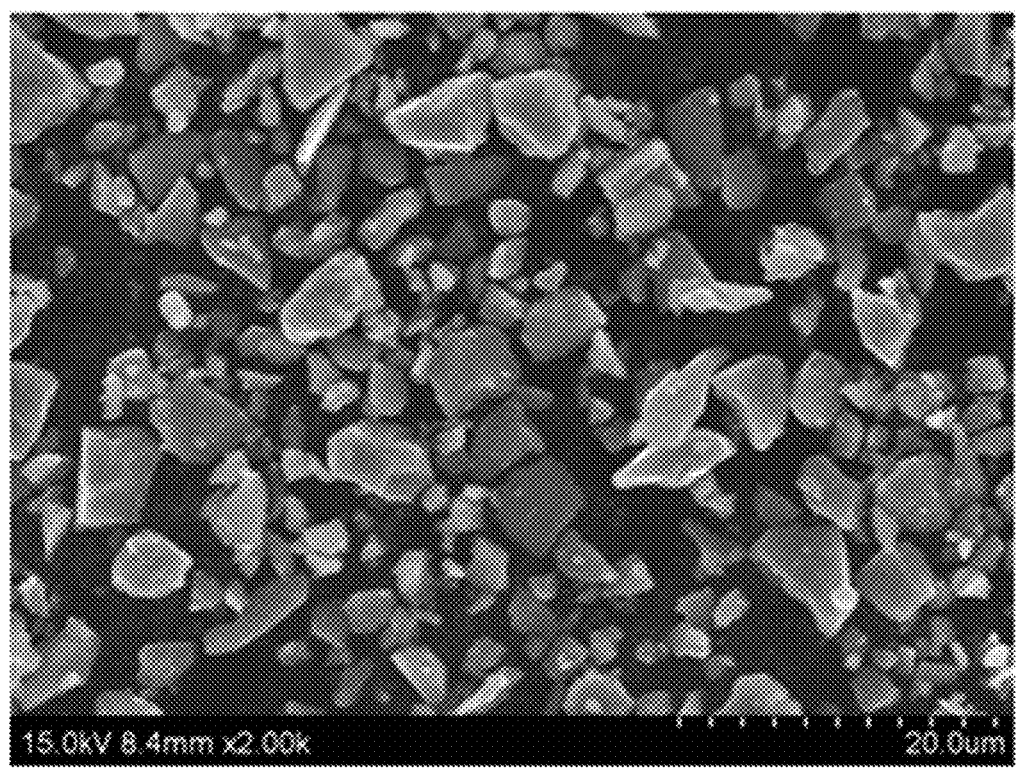
FIG. 3 is a scanning electron microscope (SEM) photographic image of an anode active material according to Embodiment example 1 of the present disclosure.

FIG. 3 is a scanning electron microscope (SEM) photographic image of an anode active material according to Embodiment example 1 of the present disclosure.

Embodiment Example 2

An anode active material was manufactured by the same method as Embodiment example 1 except that a thermal treatment temperature was adjusted to 600° C.

Embodiment Example 3

An anode active material was manufactured by the same method as Embodiment example 1 except that a thermal treatment temperature was adjusted to 1000° C.

Comparative Example 1

SiO/C anode active material was manufactured by coating (quasi)metal oxide powder (SiO, D60=5 μm) with a carbon material by the same method as Embodiment example 1 except that lithium alloying of a core was performed by thermal treatment of a mixture of a composite and lithium metal powder.

Figure 4:
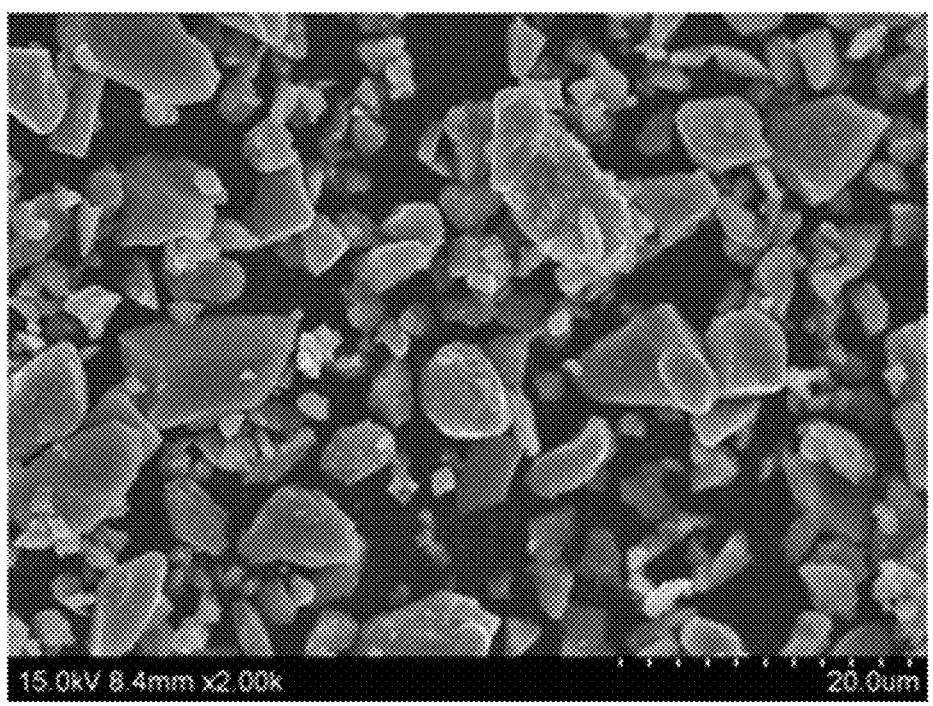
FIG. 4 is a SEM image of an anode active material according to Comparative example 1 of the present disclosure.

FIG. 4 is a SEM image of an anode active material according to Comparative example 1 of the present disclosure.

Referring to FIGS. 3 and 4, the SEM images presented in the drawings were taken from Li—SiO/C and SiO/C used in Embodiment example 1 and Comparative example 1, and it was found that there was scarcely a big outward change.

Comparative Example 2

(quasi)metal oxide powder (SiO, D60=5 μm) was mixed with lithium metal powder at a weight ratio of 92:8, and the mixture was thermally treated at 700° C. for 5 hours under an Ar atmosphere to manufacture a composite with alloyed lithium. As a result of measuring the composition of the composite, it was found that the composition of the composite had values corresponding to $0.5<x<5$ and $1<y<5$.

10 g of the SiO containing lithium was put into a rotary tube furnace, and temperature was increased to 1000° C. at a rate of 5° C./min after flowing argon gas at a rate of 0.5 L/min. Thermal treatment was performed for 2 hours while rotating the rotary tube furnace at a rate of 10 rpm/min and flowing argon gas at a rate of 1.8 L/min and acetylene gas at a rate of 0.3 L/min, to manufacture an anode active material of a core-shell structure in which a conductive carbon material as a shell is coated on the surface of SiO as a core. Here, the carbon content of the shell was 5.1 parts by weight based on 100 parts by weight of the core.

Manufacturing Example 1

Manufacture of Coin Half-cell

Each anode active material manufactured in Embodiment example 1, Comparative example 1 and Comparative example 2 was mixed with graphite at a weight ratio of 15:85, and this mixture was mixed with carbon black as a conductive material and SBR/CMC at a weight ratio of 94:2:2:2. The result was put in distilled water as a solvent and mixed to prepare a homogeneous electrode slurry. The electrode slurry was coated on one surface of a copper current collector at a thickness of 65 μm, followed by drying, rolling, and punching to a necessary size, to manufacture an anode.

As a cathode, a lithium metal was used, and an electrode assembly was manufactured with a polyolefin separator interposed between the manufactured anode and cathode.

A non-aqueous electrolyte solution was prepared by mixing ethylene carbonate (EC) and diethyl carbonate (DEC) at a volume ratio of 30:70, adding 5% of fluoro-ethylene carbonate (FEC) as an additive, and adding 1M $LiPF_6$, and then injected into the manufactured electrode assembly to fabricate a coin cell.

Experiment Example 1

Charging and Discharging Characteristics of Battery

For each coin cell of manufacturing example 1 manufactured using the anode active materials in Embodiment example 1, Comparative example 1 and Comparative example 2, first charging and discharging characteristics and life characteristics were measured under the following condition, and their results were shown in Table 1 below.

<Charging and Discharging Conditions of Coin-type Half-cell Battery (Coin Cell)>

Charging of cell: Charging was carried out to 5 mV at a constant current, and continued until the current reached 0.0050 at 5 mV.

Discharging of cell: Discharging was carried out to 1.0V at a constant current.

The coin cell ended with 50 cycle charging (lithiation) was dismantled and a lithium salt or the like was removed using DMC, and after drying, thickness was measured, and a thickness expansion ratio was calculated from the following equation.

Thickness expansion ratio(%)=(Electrode thickness after 50 cycles−Initial electrode thickness)/Initial electrode thickness*100

In the above equation, the electrode thickness corresponds to a thickness of only an active material except a thickness of a current collector.

TABLE 1

|  | Thermal treatment temperature (° C.) | Si crystal grain (nm) | Discharge capacity (mAh/g) | Charge capacity (mAh/g) | Initial efficiency (%) | Normalized capacity (%) 49$^{th}$ cycle | Thickness expansion ratio (%) |
| --- | --- | --- | --- | --- | --- | --- | --- |
| Embodiment example 1 | 700 | 45 | 527 | 579 | 91.0 | 92 | 41 |
| Embodiment example 2 | 600 | 5 | 526 | 577 | 91.2 | 93 | 40 |

TABLE 1-continued

| | Thermal treatment temperature (° C.) | Si crystal grain (nm) | Discharge capacity (mAh/g) | Charge capacity (mAh/g) | Initial efficiency (%) | Normalized capacity (%) 49$^{th}$ cycle | Thickness expansion ratio (%) |
|---|---|---|---|---|---|---|---|
| Embodiment example 3 | 1000 | 150 | 524 | 576 | 90.9 | 89 | 48 |
| Comparative example 1 | — | 5 | 542 | 646 | 83.9 | 91 | 45 |
| Comparative example 2 | 700 | 300 | 521 | 581 | 89.6 | 60 | 73 |

As seen in the above Table 1, the secondary batteries using the anode active materials of Embodiment examples 1 through 3 improved in initial efficiency by about 7.1%, compared to the secondary battery using the anode active material of Comparative example 1, and when compared to the secondary battery using the anode active material of Comparative example 1, relative degradation in life characteristics and thickness expansion ratio after charging and discharging was not observed. Because lithium alloying suppressed the crystal grain growth of Si in the SiO structure to the maximum, initial efficiency greatly increased and a side reaction did not take place, for example, degradation of thickness expansion extent and life characteristics that are an advantage of SiO.

Figure 6:
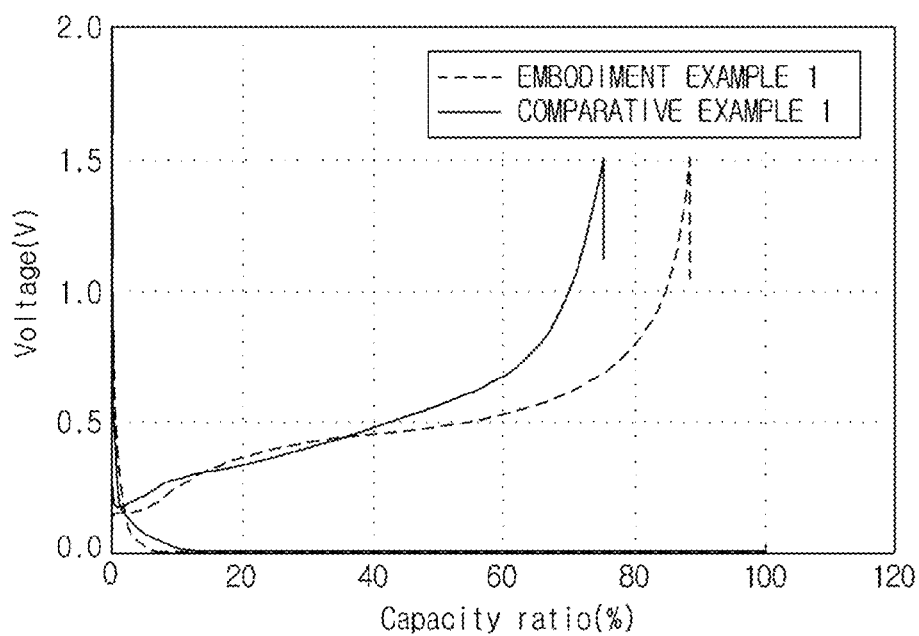
FIG. 6 illustrates an initial charging/discharging result using coin-cells manufactured using anode active materials according to Embodiment example 1 and Comparative example 1 of the present disclosure.

Referring to FIG. 6 that is normalized with respect to charge capacity, it was found that in a case of SiO/C such as Comparative example 1, initial efficiency had a value of about 75%, but when a reaction was induced by introducing about 8% of lithium, initial efficiency increased to about 88%. It can be seen that this result matches, in terms of calculation, the initial charging and discharging result of Embodiment example 1 and Comparative example 1.

Meanwhile, in a case of Comparative example 2 that enabled a reaction to occur between lithium and SiO not pre-coated with a carbon material and conducted a battery test using an anode active material in which the reactant is coated with a carbon material, as in the XRD result of FIG. 5, a result was that Si crystal grains in SiO grew very large due to a quick reaction of lithium and SiO, and it was found that there occurred a rapid degradation in life characteristics and thickness expansion ratio characteristics thereby.

Referring to FIG. 5, a portion indicated by 'Si' corresponds to a main peak of Si, and it was found that when reacted with lithium (lithium metal powder) without a carbon shell, a plurality of large (quasi)metal (Si) particles were formed in a lithium-(quasi)metal oxide alloy structure (Li—SiO), in light of a result that a peak of Si has a sharp and strong intensity as in Comparative example 2.

What is claimed is:

1. An anode active material, comprising:
    a core-shell structure,
    wherein the core includes an alloyed (quasi)metal oxide-Li (MO$_x$—Li$_y$), wherein M represents a (quasi)metal, x is greater than 0 and less than 1.5, and y is greater than 0 and less than 4,
    wherein the shell includes a carbon material coated on a surface of the core, and
    wherein a crystal grain size in the (quasi)metal included in the anode active material ranges from 45 to 150 nm.

2. The anode active material according to claim 1, wherein the (quasi)metal is selected from the group consisting of Si, Sn, Al, Sb, Bi, As, Ge, Pb, Zn, Cd, In, Ti, Ga, and alloys thereof.

3. The anode active material according to claim 1, wherein the (quasi)metal oxide is any one compound selected from the group consisting of SiO, SnO and mixtures thereof.

4. The anode active material according to claim 1, wherein a diameter of the core is in a range of 0.05 to 30 μm.

5. The anode active material according to claim 1, wherein the carbon material is crystalline carbon, amorphous carbon, or mixture thereof.

6. The anode active material according to claim 1, wherein the carbon material of the shell is in a range of 0.05 to 30 wt % based on the weight of the anode active material.

7. An anode for a lithium secondary battery, comprising:
    a current collector; and
    an anode active material layer formed on at least one surface of the current collector and including an anode active material according to claim 1.

8. A lithium secondary battery comprising:
    a cathode;
    an anode according to claim 7; and
    a separator interposed between the cathode and the anode.

9. The anode active material according to claim 1, wherein a crystal grain size in the (quasi)metal included in the anode active material ranges from 50 to 150 nm.

10. The anode active material according to claim 1, wherein a crystal grain size in the (quasi)metal included in the anode active material ranges from 60 to 150 nm.

11. A method of manufacturing an anode active material, comprising:
    (S1) forming a core-shell structure by coating the shell including a carbon material on a surface of the core including a (quasi)metal oxide;
    (S2) mixing the core-shell structure and lithium metal powder to form a mixture; and
    (S3) thermally treating the mixture to form the anode active material, wherein the core, after thermally treating the mixture, comprises an alloyed (quasi) metal oxide-Li (MO$_x$—Li$_y$) where M represents a (quasi)metal, x is greater than 0 and less than 1.5, and y is greater than 0 and less than 4 and
    wherein a crystal grain size in the (quasi)metal included in the anode active material ranges from 45 to 150 nm.

12. The method according to claim 11, wherein the (quasi)metal is selected from the group consisting of Si, Sn, Al, Sb, Bi, As, Ge, Pb, Zn, Cd, In, Ti, Ga, and alloys thereof.

13. The method according to claim 11, wherein the (quasi)metal oxide is a compound of any one selected from the group consisting of SiO, SnO and mixtures thereof.

14. The method according to claim 11, wherein a diameter of the core is in a range of 0.05 to 30 μm.

15. The method according to claim 11, wherein the carbon material is crystalline carbon, amorphous carbon, or mixture thereof.

16. The method according to claim 11, wherein the carbon material of the shell is in a range of 0.05 to 30 wt % based on the weight of the anode active material.

17. The method according to claim 11, wherein in the step of forming the mixture, a weight ratio of the composite and the lithium metal powder is in a range of 30:70 to 95:5.

18. The method according to claim 11, wherein the thermal treatment step (S3) is performed under a temperature condition in a range of 500 to 2000 ° C.

19. An anode active material manufactured by a method of manufacturing an anode active material according to claim 11.

\* \* \* \* \*